United States Patent [19]

Osgar et al.

[11] Patent Number: 6,015,068
[45] Date of Patent: Jan. 18, 2000

[54] LIQUID CHEMICAL DISPENSING SYSTEM WITH A KEY CODE RING FOR CONNECTING THE PROPER CHEMICAL TO THE PROPER ATTACHMENT

[75] Inventors: Michael L. Osgar, Eagan; Mirsaeed Rouzegar, Minneapolis, both of Minn.

[73] Assignee: Now Technologies, Inc., Bloomington, Minn.

[21] Appl. No.: 09/018,709

[22] Filed: Feb. 4, 1998

[51] Int. Cl.[7] ................................................ B65D 83/00
[52] U.S. Cl. ......................... 222/400.7; 222/105; 222/95
[58] Field of Search ............................ 222/95, 105, 183, 222/325, 386.5, 400.7, 83; 285/24, 27, 913, 914

[56] References Cited

U.S. PATENT DOCUMENTS

| | | | |
|---|---|---|---|
| 3,438,553 | 4/1969 | Johnston | 222/400.7 |
| 4,699,298 | 10/1987 | Grant et al. | 222/400 |
| 5,082,150 | 1/1992 | Steiner et al. | 222/189 |
| 5,102,010 | 4/1992 | Osgar et al. | 222/1 |
| 5,335,821 | 8/1994 | Osgar | 222/83 |
| 5,404,901 | 4/1995 | Pickrell et al. | 222/400.7 |
| 5,435,460 | 7/1995 | Osgar | 222/1 |
| 5,526,956 | 6/1996 | Osgar | 222/83 |

*Primary Examiner*—Lesley D. Morris
*Assistant Examiner*—Jorge Bocanegra
*Attorney, Agent, or Firm*—Kinney & Lange, P.A.

[57] ABSTRACT

A system for handling high purity liquid chemicals has an outer container with a mouth. A closure holding a key code ring is coupled to the mouth. The system also has a connector for coupling with the closure. The connector has a key pattern configured to mate with the key code ring in the closure. The connector is connected to a manufacturing process and coupled to the closure such that liquid chemicals can be dispensed from the container to the manufacturing process.

24 Claims, 8 Drawing Sheets

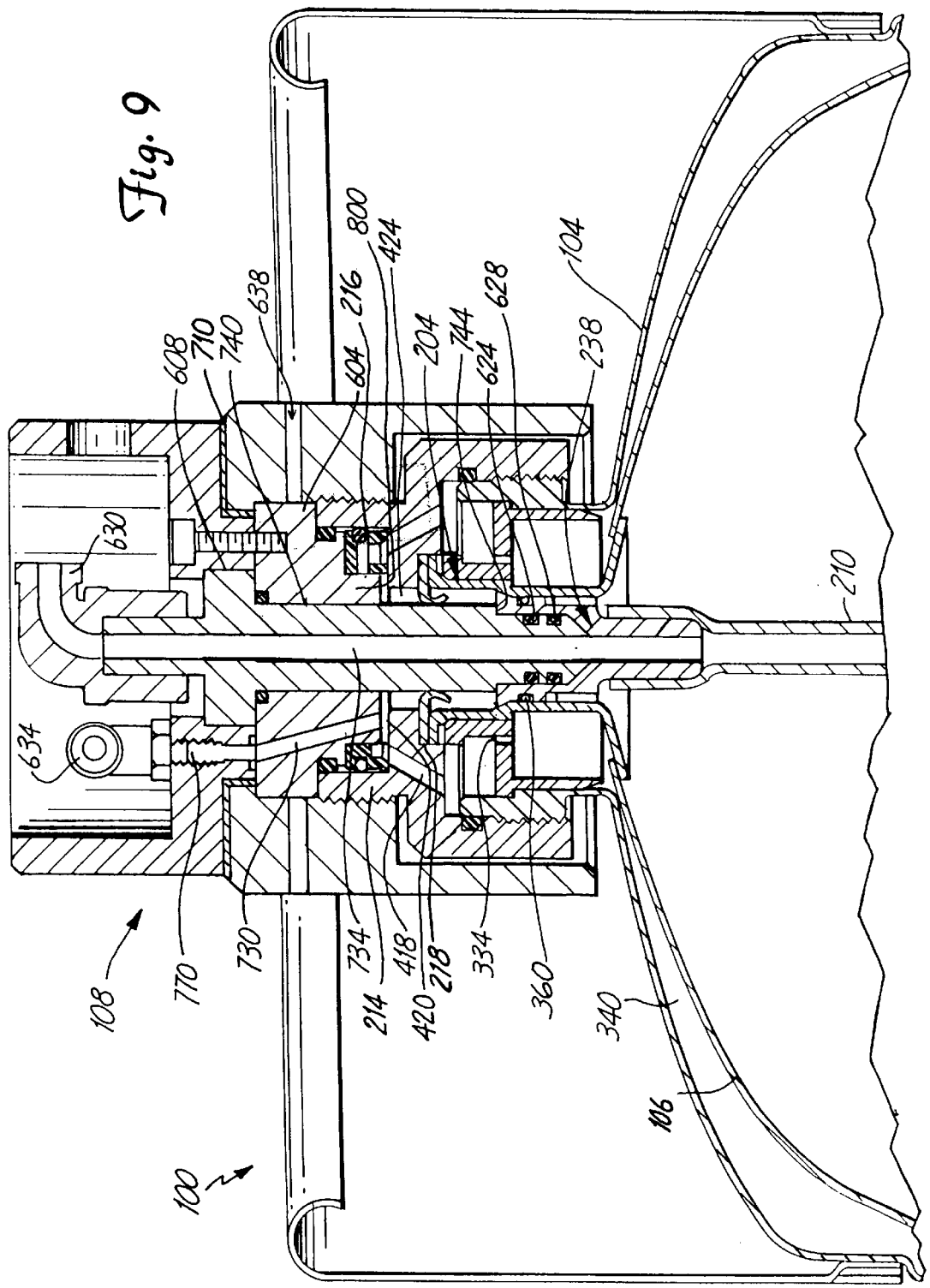

6,015,068

LIQUID CHEMICAL DISPENSING SYSTEM WITH A KEY CODE RING FOR CONNECTING THE PROPER CHEMICAL TO THE PROPER ATTACHMENT

BACKGROUND OF THE INVENTION

This invention relates to containers for storing, transporting, and dispensing liquid chemicals including: acids, solvents, bases, photoresists, dopants, inorganics, organics, biological solutions, pharmaceuticals, and radioactive chemicals. In particular, the present invention relates to using key elements to assure proper coupling of a connector to a container for proper and safe dispensing of liquid chemicals from the container.

Certain manufacturing processes require the use of liquid chemicals such as those listed above. Often, these processes require a specific liquid chemical for each particular process. Storage and dispensing systems allow alternative containers to be used to deliver liquid chemicals to a manufacturing process at a specified time or place. Successful operation of the manufacturing process relies upon personnel correctly connecting the proper liquid chemical into the system at the proper time or place. It is critical that the proper liquid chemical be installed into the system for the particular process. If the incorrect liquid chemical is installed for a particular process, it is likely to fail. Such failure is likely to result in an extremely hazardous situation for the manufacturing personnel as well as any persons in the immediate vicinity. Furthermore, it is likely that the manufacturing equipment and the articles of manufacture will be severely damaged.

SUMMARY OF THE INVENTION

The present invention is a system for ensuring connection of the correct chemical into the manufacturing process and a method for the same. The invention has an outer container with a mouth and an inner container with a port that is connected to the mouth. A closure having a key code ring is coupled to the mouth. A connector having a key pattern configured to mate with the key code ring is coupled to the closure. dr

BRIEF DESCRIPTION OF THE DRAWINGS

FIG. 5b is a sectional view of the key code ring of FIG. 5a.

FIG. 8b is a bottom plan view of the retainer of FIG. 8a.

FIG. 9 is a sectional view of an upper end of the system of FIG. 1 showing the assembled container and connector.

DETAILED DESCRIPTION OF THE PREFERRED EMBODIMENTS

Figure 1:
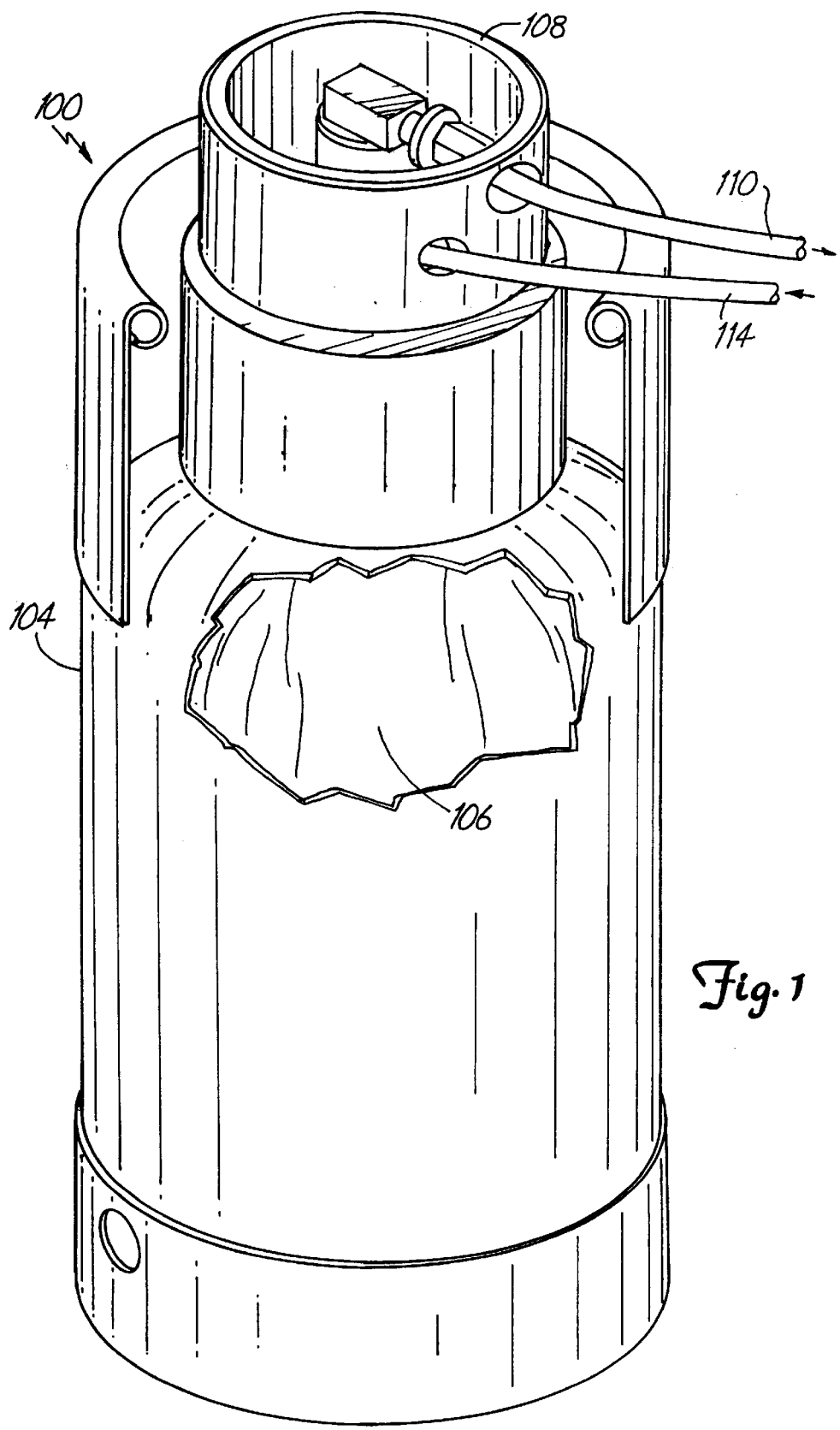
FIG. 1 is a perspective view of a liquid chemical dispensing system.

FIG. 1 shows a preferred embodiment of a double containment liquid chemical dispensing system 100 in accordance with the present invention. System 100 includes outer container 104, flexible bag 106, connector 108, tubing 110, and tubing 114. Connector 108 is in communication with a manufacturing process (not shown) through tubing 110 and with a compressed fluid source (not shown) through tubing 114.

Figure 2:
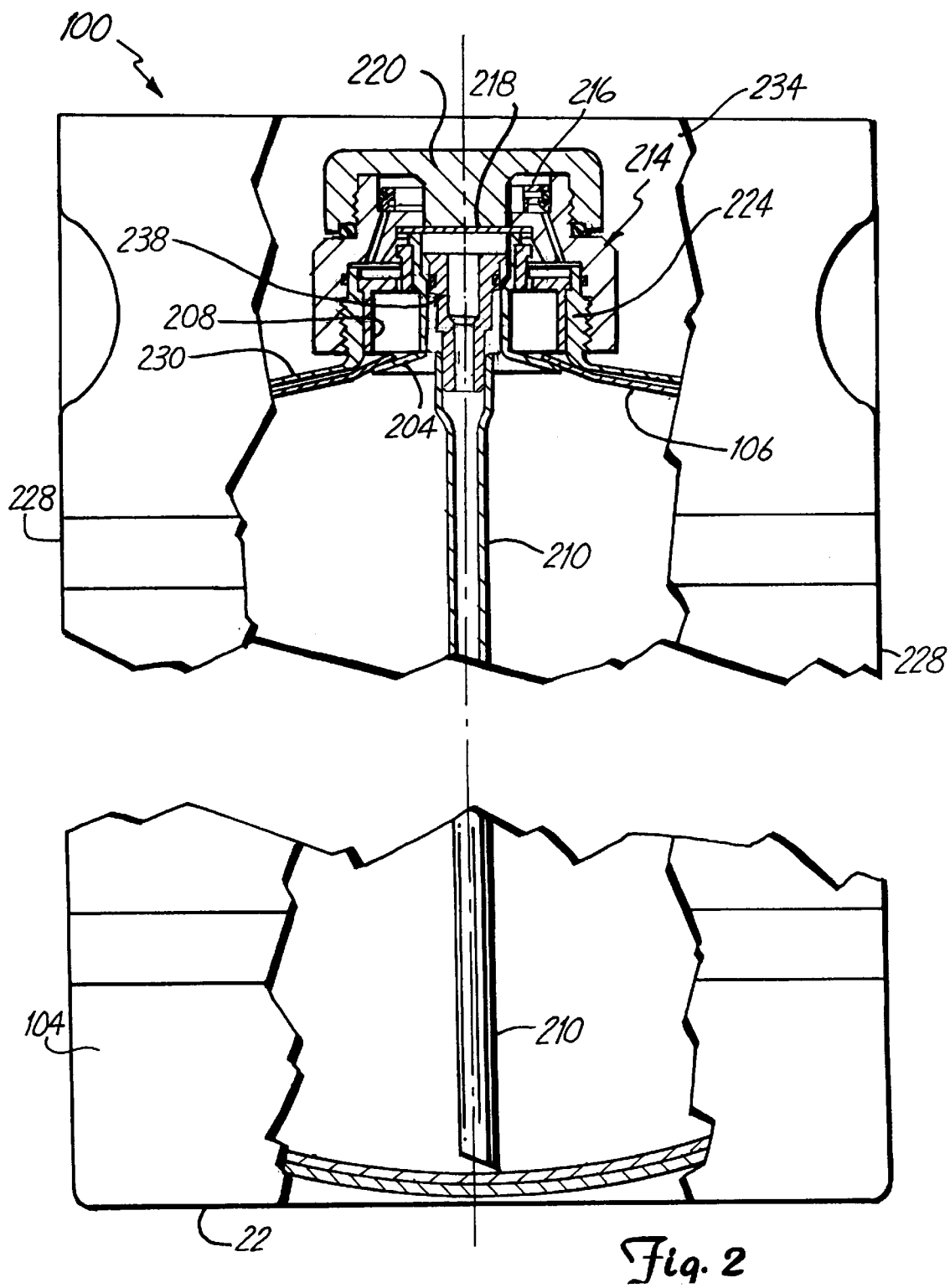
FIG. 2 is a partial sectional view of a container and a closure of the system of FIG. 1.

FIG. 2 provides a more detailed view of the various components of system 100 which includes outer container 104, flexible bag 106, fitment 204, retainer 208, dip tube 210, closure 214, key code ring 216, rupturable membrane 218, and cap 220.

Flexible bag 106 has a port that is attached to fitment 204. Dip tube 210 extends down into the interior of flexible bag 106 to near the bottom of outer container 104. Fitment 204 is mounted to externally threaded mouth 224 of outer container 104 by retainer 208 and holds the port of flexible bag 106 within outer container 104.

Outer container 104 provides the mechanical support and protection required by flexible bag 106 during filling, transporting, handling, and dispensing. Outer container 104 is typically constructed of metal, although other materials, including plastic materials, may also be used depending on the properties of the liquid chemical and upon government regulatory specifications for its handling. Outer container 104 is generally a steel drum having mouth 224, bottom 226, side wall 228, sloped top 230, and lip 234. Sloped top 230 is inset below an upper edge of side wall 228. Side wall 228 of outer container 104 protects closure 214, cap 220, and mouth 224.

During filling, flexible bag 106 is first inflated with a gas, such as nitrogen, then liquid chemical is supplied through fitment 204 to fill flexible bag 106 within outer container 104. After flexible bag 106 is filled, dip tube 210 and dip tube coupling 238 are inserted into fitment 204. Dip tube coupling 238 rests within fitment 204 and supports dip tube 210 within flexible bag 106. Dip tube coupling 238 allows any built-up gases to vent into the upper area of fitment 204. Dip tube 210 permits outer container 104 to be kept upright while liquid chemical is dispensed. Dip tube 210 also insures that the complete contents of flexible bag 106 are emptied. Consequently, dip tube 210 allows for safe dispensing of liquid chemicals from large containers. To assure that contamination is kept to a minimum, dip tube 210 is installed immediately after flexible bag 106 is filled with liquid chemical. Because dangerous drips and spills can occur when dip tube 210 is removed, dip tube 210 is not removed until after all liquid chemical is dispensed from flexible bag 106.

Closure 214 encloses fitment 204, dip tube coupling 238, and mouth 224 of outer container 104 while sealing fitment 204 and outer container 104 with rupturable membrane 218. Cap 220 covers and protects rupturable membrane 218 during shipping and handling of container. Closure 214 also holds key code ring 216 which permits connection only to the proper connector 108 (shown in FIG. 1).

Figure 3:
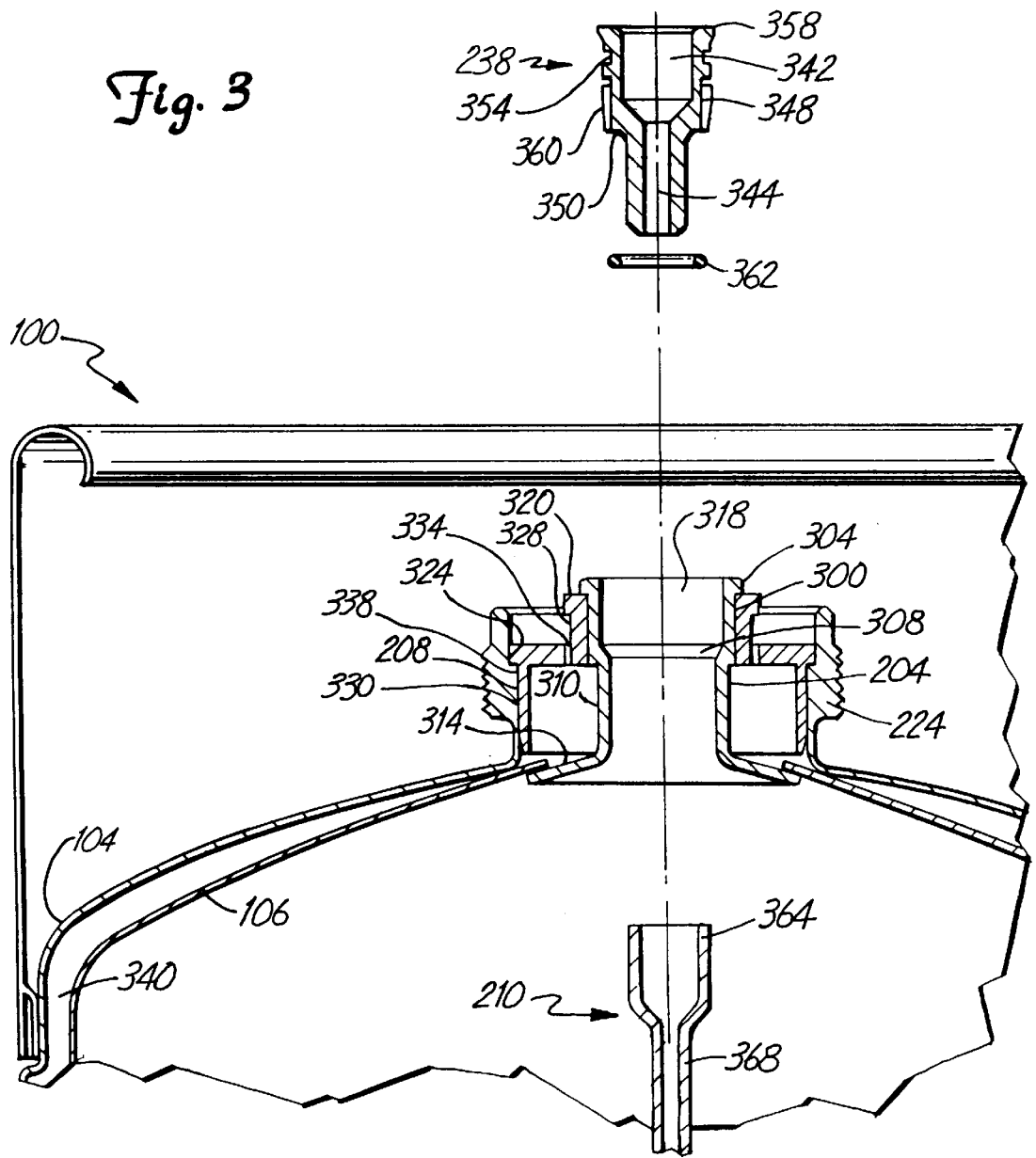
FIG. 3 is an exploded sectional view of a mouth of the container of FIG. 2.

FIG. 3 shows an exploded sectional view of outer container 104, flexible bag 106, fitment 204, retainer 208, dip tube 210, and dip tube coupling 238. As best shown in FIG. 3, fitment 204 includes mouth 300, lip 304, throat 308, neck 310, shoulder 314, and portal 318. Portal 318 extends through fitment 204 and is in communication with interior of flexible bag 106. Lip 304 is located at an upper end of mouth 300 and extends horizontally outward from mouth 300 at a ninety degree angle. Toward a lower end of mouth 300, fitment 204 narrows to form throat 308. Neck 310 extends from throat 308 down into outer container 104 at which point fitment 204 extends outwards substantially horizontal from neck 310 to form shoulder 314. Shoulder 314 supports flexible bag 106 within outer container 104. Flexible bag 106 is sealed to shoulder 314 such that during filling of flexible bag 106 liquid chemical cannot come in contact with outer container 104.

Retainer 208 mounts fitment 204 within mouth 224 of outer container 104 and includes brim 320, horizontal ledge 324, side walls 328, support walls 330, and opening 334. Brim 320 is horizontal and extends outward from a top end of side walls 328. Below brim 320, retainer 208 extends vertically, bends at a right angle outward from side walls 328 to form horizontal ledge 324 then bends ninety degrees downward to form vertical support walls 330. An inside diameter of side walls 328 and brim 320 is wider then outside diameter of mouth 300 of fitment 204. Brim 320 supports fitment 204 below lip 304 of fitment 204. Horizontal ledge 324 rests upon edge 338 located on an inner surface of mouth 224 of outer container 104. Edge 338 supports retainer 208 within mouth 224 of outer container 104. Opening 334 within horizontal ledge 324 is in communication with compression space 340 and permits a fluid to be supplied to compression space 340. Fluid is supplied to compression space 340 to collapse flexible bag 106 and force liquid chemical up through dip tube 210 to dispense liquid chemical. Alternatively, liquid chemical can be pumped out of flexible bag 106. In this configuration, opening 334 vents air to compression space 340 to allow flexible bag 106 to collapse.

Dip tube coupling 238 rests within fitment 204. Dip tube coupling 238 includes cavity 342, liquid passage 344, annular ring 360, shoulder 350, groove 354, rim 358, and notch 348. Cavity 342 is centered within dip tube coupling 238 at its upper end and narrows towards its lower end to communicate with the fluid passage 344. Fluid passage 344 is centered within dip tube coupling 238 and extends from cavity 342 to a lower end of dip tube coupling 238. Annular ring 360 is integral to an outer surface of dip tube coupling 238. Notch 348 extends vertically through annular ring 360. Shoulder 350 is located below annular ring 360 and is formed where the outer surface of dip tube coupling 238 narrows sharply inward. Brim 358 is formed at the upper end of dip tube coupling 238 where the outer surface of dip tube coupling 238 protrudes outward. Groove 354 is in the outer surface of dip tube coupling 238 and is located above annular ring 360 and below brim 358. O-ring 362 sits within groove 354 and acts as a seal between dip tube coupling 238 and fitment 204. Annular ring 360 holds dip tube coupling 238 within fitment 204 slightly below throat 310 of fitment 204.

Dip tube 210 is mounted on the lower end of dip tube coupling 238 below shoulder 350. The upper end of dip tube 210 forms funnel 364 and narrows to form tube 368 which extends down into interior of flexible bag 106. The inside diameter of funnel 364 is wider then an outside diameter of dip tube coupling 238 below its shoulder 350. Funnel 364 couples with dip tube coupling 238 such that fluid passage 344 of dip tube coupling 238 is in fluid communication with tube 368 of dip tube 210. During dispensing of liquid chemical, liquid chemical is forced up from the bottom of flexible bag 106, through tube 368, and through fluid passage 344 of dip tube coupling 238.

Figure 4:
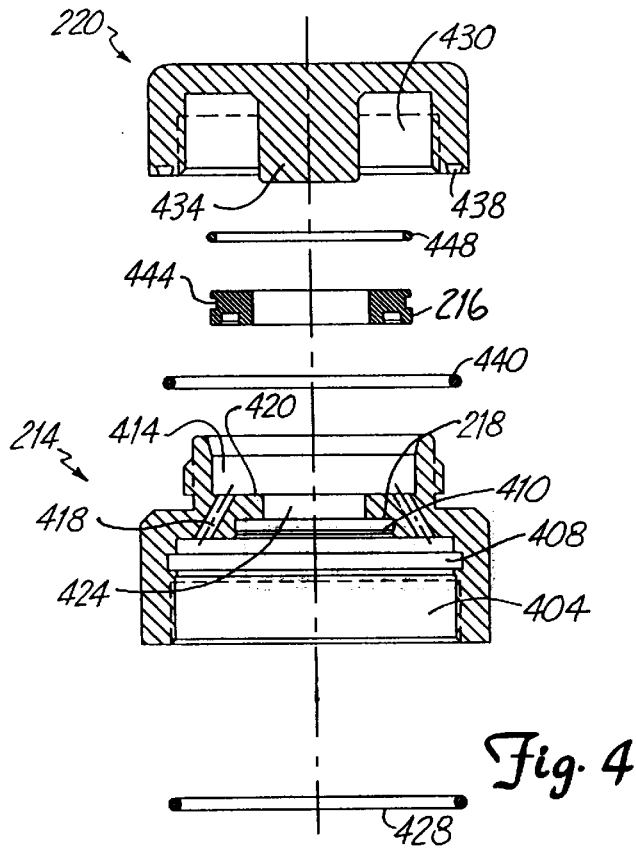
FIG. 4 is an exploded sectional view of the closure of FIG. 2.

FIG. 4 shows an exploded view of closure 214 and cap 220. Closure 214, with rupturable membrane 218, connects to mouth 224 of outer container 104 (shown in FIG. 3). Closure 214 also holds key code ring 216 used to prevent connection of the wrong liquid chemical to the wrong connector.

Closure 214 includes lower bore 404, groove 408, lip spacer 410, upper bore 414, compression passage 418, and horizontal ledge 420. Lower bore 404 is centered within closure 214 at lower end of closure 214. Lower bore 404 includes internal threads for engaging external threads on mouth 224 of outer container 104. Groove 408 is located towards an upper end of lower bore 404. Lip spacer 410 is located above lower bore 404. Lip spacer 410 has an inside diameter slightly larger than the outside diameter of lip 304 of fitment 204. The height of lip spacer 410 is equal to or greater than the height of lip 304. Rupturable membrane 218 seals the lower end of throat 424 and separates lip spacer 410 and lower bore 404 from throat 424 and upper bore 414. Upper bore 414 is centered within a top end of closure 214. The upper end of closure 214 has external threads for engaging internal threads of cap 220. Compression passage 418 extends from upper bore 414 through closure 214 to lower bore 404 bypassing rupturable membrane 218. Groove 408 holds O-ring 428 which seals between mouth 224 of outer container 104 and closure 214. Compression passage 418 and opening 334 of retainer 208 (shown in FIG. 3) permit fluid under pressure to be supplied to compression space 340 so that flexible bag 106 (shown in FIG. 3) can be collapsed to dispense liquid chemical.

During shipping and handling, cap 220 is screwed to the top end of closure 214. Cap 220 includes inner cavity 430, protrusion 434, and groove 438. Inner cavity 430 is centered within a lower end of cap 220 and has internal threads for engaging external threads of closure 214. Protrusion 434 extends from top end of cap 220 into inner cavity 430 and is formed to fit throat 424 of closure 214. Groove 438 is located on the bottom surface of cap 220. Groove 438 carries O-ring 440 which seals between closure 214 and cap 220 when cap 220 is screwed onto closure 214. Protrusion 434 also provides structural support to rupturable membrane 218. As an alternative to rupturable membrane 218, as would be obvious to one of ordinary skill in the art, a cap seal may be fitted over protrusion 434 to act as a seal when cap 220 is attached to closure 214. Cap 220 acts to seal outer container 104 to ensure against dangerous drips and spills from outer container 104 and to prevent contamination of the contents.

Closure 214 holds key code ring 216. Key code ring 216 sits in a recess at the top end of closure 214 on horizontal ledge 420 just above throat 424 such that no part of key code ring 216 protrudes into space above throat 424. In other words, when cap 220 is screwed down onto closure 214, protrusion 434 will not contact any portion of the key code ring 216. The outside diameter of the key code ring 216 is slightly smaller than upper bore 414 of the closure 214 such that when key code ring 216 is fitted with an O-ring 448 in outer groove 444, it can be compression fit into upper bore 414 of closure 214.

FIGS. 5a–5d provide detailed views of key code ring 216 in perspective view, in a center cross section, in top view, and in bottom view. Key code ring 216 sits at a top end of closure 214 (shown in FIG. 4) and acts as an essential safety feature by allowing coupling of closure 214 only with the correct connector 108 (shown in FIG. 1). In a preferred embodiment, key code ring 216 is manufactured from any suitable polymeric or plastic material as would be obvious to one of ordinary skill in the art.

Figure 5A:
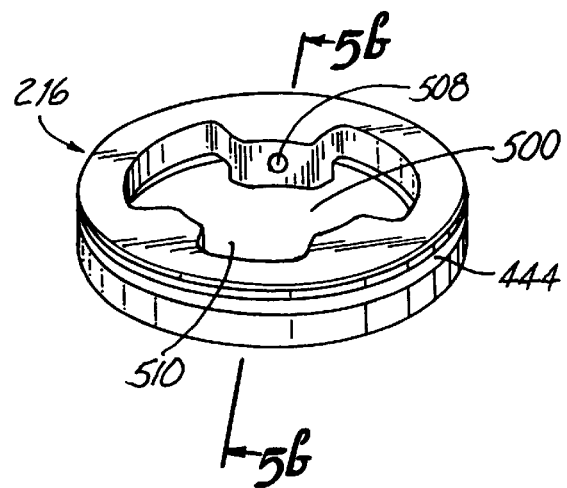
FIG. 5a is a perspective view of a key code ring.
Figure 5B:
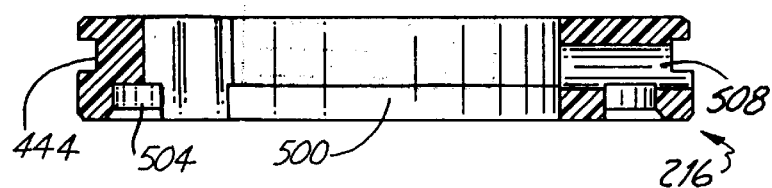

Key code ring 216 is shaped as a disk with an aperture through its center. Key code ring 216 includes outer groove 444, bore 500, lower groove 504, hole 508, and notches 510. As shown in FIGS. 5a and 5b, outer groove 444 extends around the periphery at an upper end of key code ring 216 and is configured to accept O-ring 448 for purposes of holding key code ring 216 within closure 214. Bore 500 extends through a center of key code ring 216 from a top surface to a bottom surface and has a diameter that is approximately equal to the diameter of throat 424 of closure 214. Lower groove 504 extends partially into the bottom surface of key code ring 216 and circumscribes bore 500. Lower groove 504 is rectangular in cross-section with the outer surface angling toward the periphery near the bottom surface of key code ring 216. The distance of lower groove 504 from a center of key code ring 216 is such that lower groove 504 is in communication with compression passage 418. Hole 508 extends from bore 500 outward to the periphery of key code ring 216. Hole 508 facilitates insertion and removal of key code ring 216 relative to upper bore 414 of closure 214.

Figure 5C:
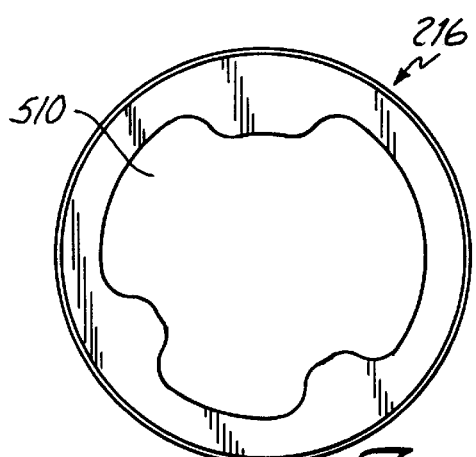
FIG. 5c is a top view of the key code ring of FIG. 5a with notches.
Figure 5D:
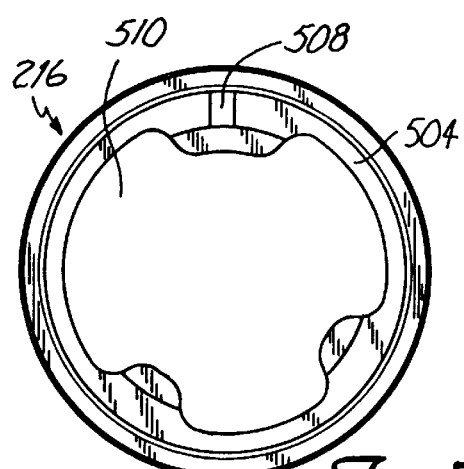
FIG. 5d is a bottom view of the key code ring of FIG. 5a with notches.

As shown in FIGS. 5c and 5d, a set of notches 510 extend from bore 500 towards, but not reaching, the periphery of key code ring 216. As best shown in FIG. 5d, notches 510 extend radially outward far enough to contact lower groove 504. FIGS. 5c and 5d show but one of an infinite number of notch configurations. The particular notch configuration identifies the contents of flexible bag 106. For example, key code ring 216, having the notch configuration shown in FIGS. 5c and 5d, will be used on all outer containers 104 (shown in FIG. 1) holding the same liquid chemical. Any outer container 104 holding a different liquid chemical will use a key code ring 216 having a distinct notch configuration.

When key code ring 216 is pressed into upper bore 414 of closure 214 and properly seated upon horizontal ledge 420 (shown in FIG. 4), it acts to preclude coupling with the incorrect connector 108 (shown in FIG. 1). Only a connector 108 that is configured to mate with notches 510 will be accepted by key code ring 216. This avoids an unsafe situation by insuring that the contents of flexible bag 106 will be used only at the appropriate point in the manufacturing process.

Figure 6:
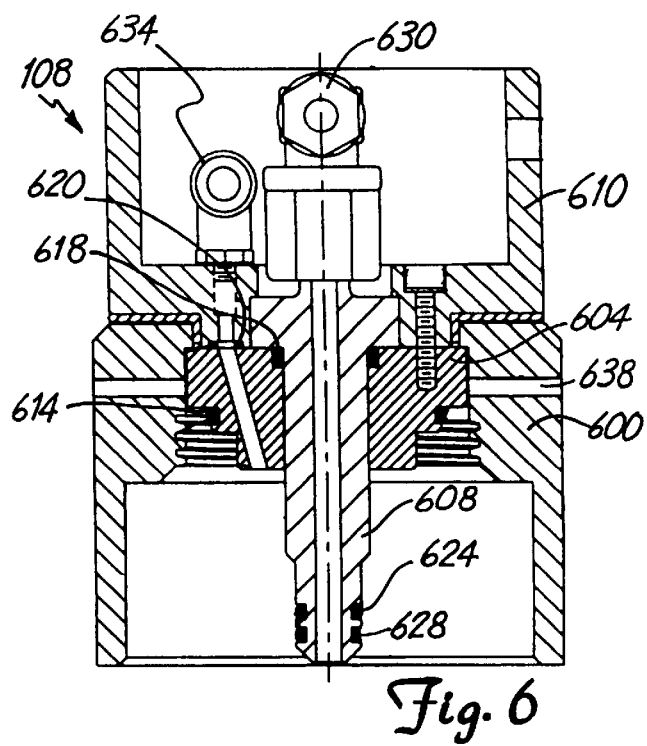
FIG. 6 is a sectional view of a connector of the system of FIG. 1.

FIG. 6 shows a cross section of connector 108 as assembled. Connector 108 includes lower connector 600, retainer 604, probe 608, and upper connector 610. Connector 108 also includes O-rings 614, 618, 620, 624, and 628. The connecting components of connector 108 include male elbow 630 and swivel elbow 634. Finally, connector 108 includes vent 638. Connector 108 is coupled to closure 214 (shown in FIG. 4) and connects the contents of flexible bag 106 (shown in FIG. 3) with the manufacturing process (not shown).

Figure 7:
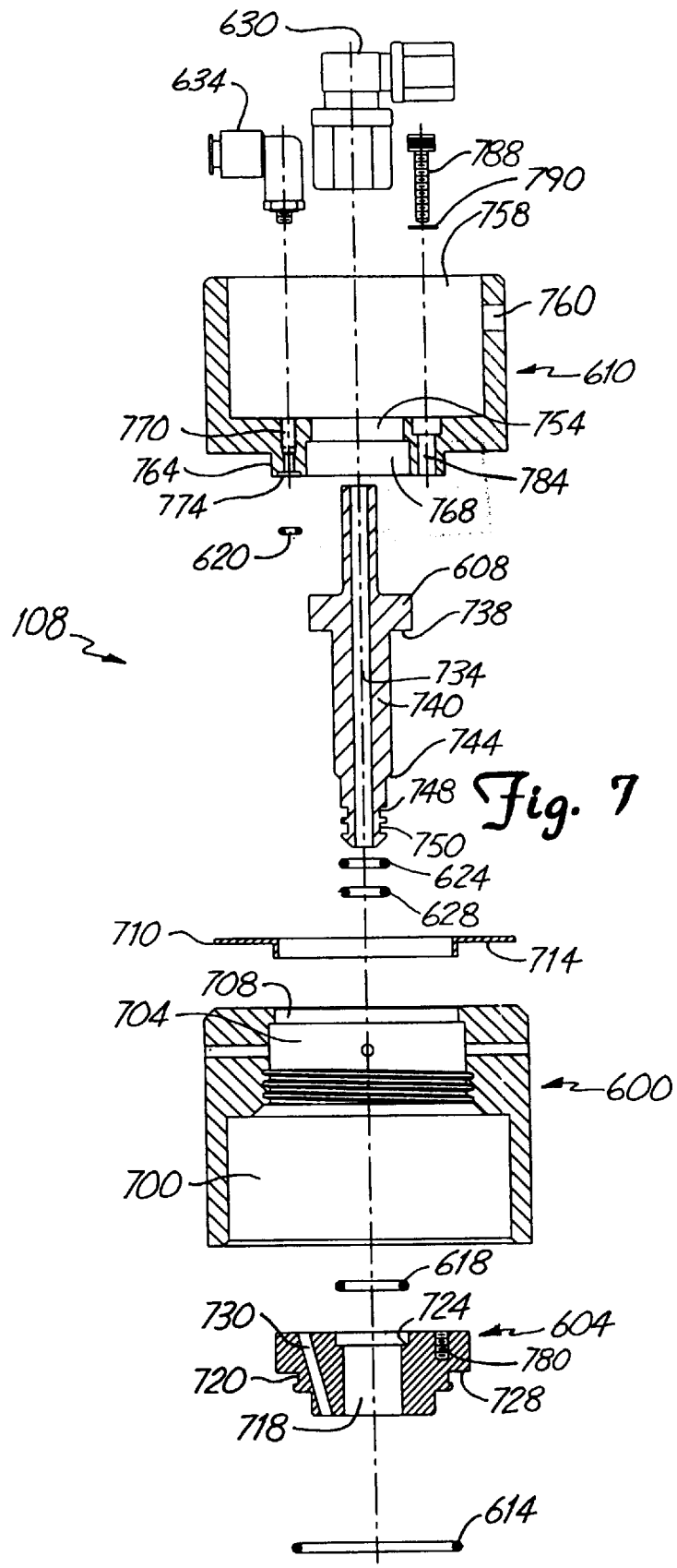
FIG. 7 is an exploded sectional view of the connector of FIG. 6.

FIG. 7 shows an exploded view of connector 108. Lower connector 600 includes lower bore 700, middle bore 704, and top bore 708. Lower bore 700 is centered within a lower end of lower connector 600. Middle bore 704 is centered within lower connector 600 and above lower bore 700. Middle bore 704 is narrower than lower bore 700, has internal threads for engaging external threads of closure 214, and has an inside diameter wide enough to accept retainer 604. Top bore 708 is centered within a top end of lower connector 600. Top bore 708 is located above and is in communication with middle bore 704. Top bore 708 has a diameter large enough to couple with protrusion 764 of upper connector 610. Bushing 710 has outer diameter equal to diameter of top bore 708. Bushing 710 has a ledge 714 extending from a top surface. Bushing 710 sits between lower connector 600 and upper connector 610 allowing lower connector 600 to rotate freely with respect to upper connector 610.

Retainer 604 fits within middle bore 704 of lower connector 600 and includes central bore 718, groove 720, groove 724, shoulder 728, compression passage 730, and bolt receptor 780. Central bore 718 extends through a center of retainer 604. Groove 724 extends along an outer edge of a top end of central bore 718 to receive O-ring 618. Shoulder 728 extends along an outer surface of retainer 604 near a midpoint of retainer 604. Groove 720 extends along the outer surface of retainer 604 below shoulder 728 and receives O-ring 614. Compression passage 730 runs outside of central bore 718 and extends through retainer 604 from a top end to a bottom end.

Probe 608 extends through central bore 718 of retainer 604 and is supported by retainer 604. Probe 608 includes flow passage 734, shoulder 738, shaft 740, shoulder 744, and grooves 748 and 750. Male elbow 630 is attached to an upper end of probe 608 using a compression-style fitting. Flow passage 734 is centered within probe 608 and extends from upper end to a lower end of probe 608. Below the upper end of probe 608, an outer surface of probe 608 widens to form shoulder 738. Shaft 740 extends from below shoulder 738 to a lower end of probe 608. The lower end of probe 608 narrows further to form shoulder 744. Below shoulder 744 the lower end of probe 608 has grooves 748 and 750 which hold O-rings 624 and 628. Below groove 750, the lower end of probe 608 is cut at a forty-five degree angle to form a tip.

Grooves 748 and 750 extend circumferentially around an outer surface of shaft 740. O-rings 624 and 628 are carried by grooves 748 and 750 and function to seal between probe 608 and dip tube coupling 238 during the dispensing of liquid chemicals from container 104.

As further shown in FIG. 7, upper connector 610 includes lower cavity 754, upper cavity 758, opening 760, protrusion 764, bore 768, compression conduit 770, and bolt passageway 784. Protrusion 764 extends from a bottom end of upper connector 610 and has an outside diameter smaller than the inside diameter of bushing 710. Upper cavity 758 is centered within a top end of upper connector 610. Opening 760 extends from upper cavity 758 through a side wall of upper connector 610. Lower cavity 754 is centered at a bottom end of upper connector 610 and has a diameter sufficiently large to accept the base of male elbow 630. Bore 768 is centered within protrusion 764 of upper connector 610. The diameter of bore 768 is greater than the diameter of lower cavity 754 and slightly greater than the diameter of shoulder 738 of probe 608.

Compression conduit 770 is located to the outside of lower cavity 754 and bore 768 and extends from upper cavity 758 through protrusion 764 to lower end of upper connector 610. Groove 774 is at a bottom end of compression conduit 770 and extends around an outer surface of compression conduit 770. Groove 770 accepts O-ring 620 for sealing compression conduit 770 to retainer 604. A top end of compression conduit 770 has internal threads for engaging external threads of swivel elbow 634 which is connected to a compressed fluid source 114.

When connector 108 is assembled, shaft 740 of probe 608 extends through central bore 718 of retainer 604. Shoulder 738 of probe 608 rests upon top end of retainer 604. O-ring 618 is carried by groove 724 and creates a seal between shoulder 738 of probe 608 and retainer 604. Probe 608 extends through middle bore 704 into lower bore 700 of connector 600. Bushing 710 sits within top bore 708 of lower connector 600 and ledge 714 extends over top surface of lower connector 600.

When connector 108 is fully assembled, the shoulder 738 of probe 608 fits within bore 768 of upper connector 610. Protrusion 764 of upper connector 610 fits within bushing 710 within top bore 708 of lower connector 600. Retainer 604 fits within middle bore 704 of lower connectors 600 and is aligned such that compression passage 730 is aligned with the compression conduit 770 of upper cavity 610. Compression conduit 770 and compression passage 730 are sealed by O-ring 620 within groove 774. Retainer 604 is fastened to protrusion 764 of upper connector 610 by inserting bolt 788 through washer 790, and into threads of bolt receptor 780. In this configuration, upper connector 610 and retainer 604 are free to rotate with respect to lower connector 600 as assisted by bushing 710. External threads of swivel elbow 634 are screwed down onto internal threads of compression conduit 770 of upper connector 610. Male elbow 630 is attached to a top end of probe 608 using a compression-style fitting.

Figure 8A:
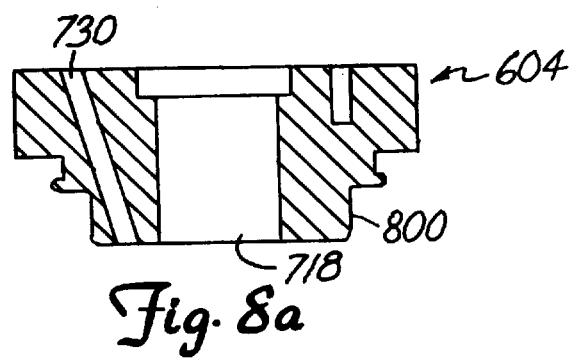
FIG. 8a is a sectional view of a retainer.
Figure 8B:
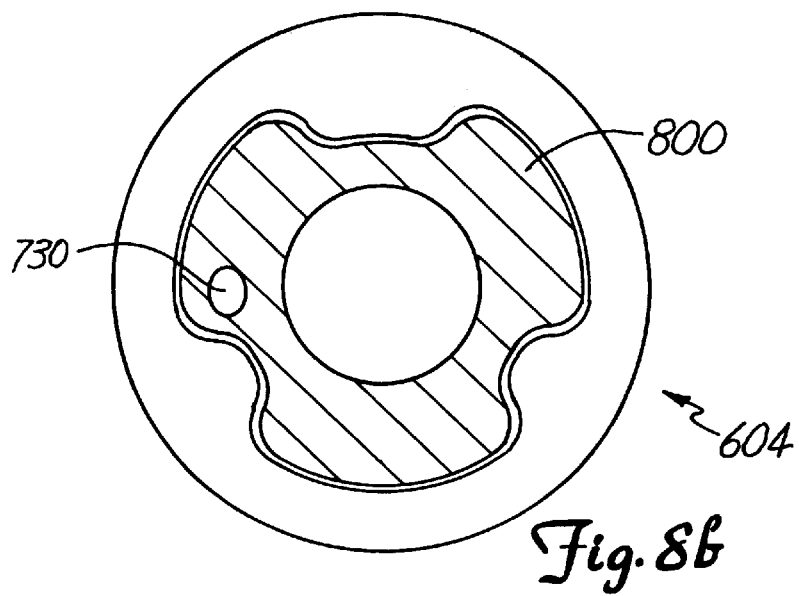
Figure 8C:
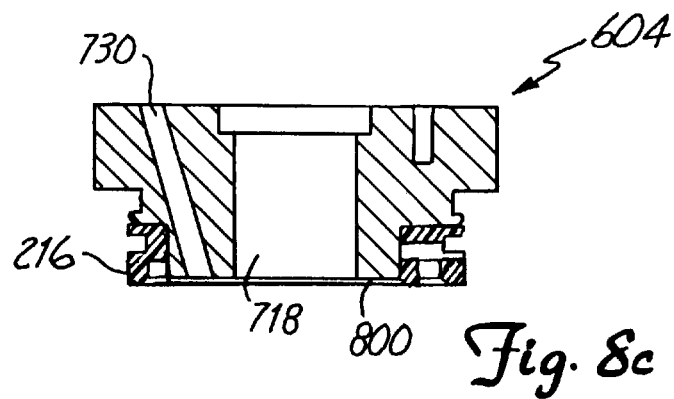
FIG. 8c is a sectional view of the retainer of FIG. 8a and the key code ring.

FIGS. 8a and 8b show a sectional view and bottom plan view of retainer 604. FIG. 8a shows a vertical sectional view of retainer 604. As shown in FIG. 8b, an amount of material is removed from the perimeter of a bottom end of retainer 604 such that key pattern 800 is formed. Key pattern 800 must be cut such that material removed does not disturb the integrity of compression passage 730. The key pattern 800, as shown in FIG. 8b determines which liquid chemical connector 108 (shown in FIG. 6) will dispense. Key pattern 800 corresponds to a specific and particular liquid chemical that the connector 108 (shown in FIG. 6) will dispense. Key pattern 800 on the bottom of retainer 604 is cut to fit with one and only one corresponding key code ring 216. FIG. 8c shows a sectional view of retainer 604 and key code ring 216 in a mated position. This figure demonstrates how key pattern 800 mates with key code ring 216.

FIG. 9 shows connector 108 engaging closure 214 with cap 220 (shown in FIG. 4) removed during the dispensing of liquid chemical from liquid chemical dispensing system 100. To dispense liquid chemical, cap 220 is removed and shaft 740 of probe 608 is inserted through throat 424 of closure 214 and then through rupturable membrane 218. Upon puncture of rupturable membrane 218, gas that is accumulated within fitment 204 and dip tube coupling 238 is released. Insertion of probe 608 continues until tip of probe 608 contacts dip tube coupling 238. O-ring 624 and O-ring 628 on lower end of probe 608 seal between probe 608 and dip tube coupling 238. O-ring 360 of dip tube coupling 238 is also forced further down into fitment 204 thereby effectuating a seal between dip tube coupling 238 and fitment 204 to prevent liquid chemical from flowing past probe 608 and to avoid dangerous chemical spills.

Complete insertion of probe 608 is not possible unless key pattern 800 of retainer 604 is properly inserted into and properly mates with key code ring 216 in closure 214. The dimensions of the retainer are such that key pattern 800 protrudes from retainer 604 an amount less than the thickness of key code ring 216.

When key pattern 800 of retainer 604 is properly inserted into key code ring 216, a manifold is formed between retainer 604 and horizontal ledge 420 of closure 214. The manifold is in communication with both compression passage 730 of retainer 604 and compression passage 418 of closure 214 thereby creating a sealed system from the compressed fluid source (not shown) to the compression space 340.

If key pattern 800 and key code ring 216 do not match, the manifold will remain open to the atmosphere via vent 638. In this situation, dispensing of fluid will not be possible as compressed gas entering the manifold will vent to the atmosphere rather then entering compression space 340.

After probe 608 is fully inserted into cavity 368 of dip tube 210 and key pattern 800 is properly aligned with key code ring 216, pressurized fluid can be supplied into swivel elbow 634 where the compressed fluid, preferable compressed air or compressed nitrogen, is allowed to flow through compression conduit 770, through compression passage 730, into manifold, through compression passage 418, through opening 334, and into compression space 340. Once in compression space 340, the pressurized fluid will begin to collapse flexible bag 106 inside outer container 104 and force liquid chemical up through dip tube 210, through dip tube coupling 238, through flow passage 734 of probe 608, into male elbow 630, and out to the manufacturing process (not shown).

The double containment liquid chemical dispensing system 100 of the present invention provides significant advantages over those in the prior art. The present invention allows a liquid chemical to be dispensed only if the key pattern 800 and the key code ring 216 match. This feature will prevent operators from connecting the wrong liquid chemical to the wrong location in the manufacturing process. In addition, the keying system of the present invention is versatile and economical. The key code ring 216 may embody an infinite number of different notch patterns. Also, the key code ring 216 is inexpensive and easy to manufacture. Perhaps most significantly, the keying system of the present invention may be used in conjunction with outer containers 104, closures 214, and connectors 108 that have already been manufactured.

Although the present invention has been described with reference to preferred embodiments, workers skilled in the art will recognize that changes may be made in form and detail without departing from the spirit and scope of the invention.

I claim:

1. A container for holding liquid chemicals comprising:

an outer container having a mouth;

an inner container having a port;

means for coupling the port to the mouth;

a closure coupled to the mouth, the closure having an aperture and a first gas passageway therethrough, the first gas passageway in communication with an outside of the inner container;

a key code ring removably supported at an upper end of the closure;

a connector for coupling with the closure, the connector having a bottom end and a second gas passageway therethrough in communication with a gas source; and a key pattern connected to the bottom end of the connector, the key pattern configured to mate with the key code ring so as to form a manifold in communication with the first gas passageway and the second gas passageway.

2. The container as defined in claim 1, further comprising a penetrable membrane covering the port of the inner container.

3. The container as defined in claim 1, wherein the key code ring is a disk having a central aperture therethrough, the disk having a notch therein and the key pattern having a protrusion configured to mate with the key code ring.

4. The container as defined in claim 1, wherein the closure has a first gas passageway therethrough in communication with an outside of the inner container, the connector has a second gas passageway therethrough in communication with a gas source, and the key code ring mates with the key pattern so as to form a manifold in communication with the first gas passageway and the second gas passageway.

5. The container as defined in claim 1, wherein the key code ring defines a notch adjacent to the aperture of the closure and the key pattern defines a protrusion from the connector, the protrusion configured to mate with the notch.

6. The container as defined in claim 1, wherein the connector has internal threads for engaging external threads of the closure for coupling.

7. The container as defined in claim 1, wherein the connector further comprises:

a liquid passageway therethrough;

a gas passageway therethrough; and a probe in communication with the liquid passageway.

8. The container as defined in claim 1, wherein the key code ring has a configuration which represents a specific chemical.

9. The container as defined in claim 1, wherein the key code ring has a bottom side, the bottom side having a groove therein circumscribing a central aperture of the key code ring and in communication with a passageway in the closure.

10. The container as defined in claim 1, wherein the aperture defines a shoulder at the upper end of the closure and the key code ring is supported by the shoulder.

11. A method of insuring proper connection of chemicals in a production process, the method comprising:

providing a flexible bag having an interior for holding liquid, the bag having a port in communication with the interior;

placing the flexible bag within an outer container having a mouth and connecting the port to the mouth;

attaching a closure having a top end over the mouth, the closure having a first liquid passageway and a first gas passageway therethrough;

attaching a key code ring to the closure top end;

providing a connector having a second gas passageway and a fluid probe defining a second liquid passageway, the second liquid passageway in communication with the production process;

attaching a key pattern to the connector circumscribing the fluid probe, the key pattern configured to mate with the key code ring so as to form a manifold in communication with the first gas passageway and the second gas passageway;

inserting the fluid probe into the first fluid passageway and coupling the connector to the closure such that if the key code ring mates with the key pattern a manifold is formed thereby which places the first gas passageway in communication with the second gas passageway, and if the key code ring does not mate with the key pattern the first gas passageway is in communication with the atmosphere; and connecting the gas passageway to a compressed gas source.

12. A container for holding liquid chemicals comprising:

an outer container having a mouth;

an inner container having a port;

means for coupling the port to the mouth;

a closure coupled to the mouth, the closure having an aperture therethrough;

a key code ring having a bottom side, supported at an upper end of the closure, the bottom side having a groove therein circumscribing a central aperture of the key code ring and in communication with a passageway in the closure;

a connector for coupling with the closure, the connector having a bottom end; and a key pattern connected to the bottom end of the connector, the key pattern configured to mate with the key code ring.

13. A container for holding liquid chemicals, the container comprising:

an outer container having a mouth;

an inner container having a port, the port coupled to the mouth;

a closure coupled to the mouth, the closure having an aperture therethrough, the aperture in communication with the port of the inner container;

a key code ring supported at an upper end of the closure;

a connector having a probe extending from a bottom end thereof, the connector coupled to the closure such that the probe of the connector extends through the aperture of the closure; and a key pattern connected to the bottom end of the connector, the key pattern configured to mate with the key code ring such that the probe engages the port of the inner container.

14. The container of claim 13 further comprising a dip tube extending from near the port of the inner container to near a bottom of the inner container.

15. The container of claim 14 wherein the probe engages the dip tube such that a seal is formed only if the key pattern is configured to mate with the key code ring.

16. The container as defined in claim 12 further comprising a penetrable membrane covering the port of the inner container.

17. The container of claim 12 wherein the key code ring is a disc having a central aperture therethrough, the disc having a notch therein, and further wherein the key pattern has a protrusion configured to mate with the key code ring.

18. The container of claim 12 wherein the closure has a first gas passageway therethrough in communication with an outside of the inner container, the connector has a second gas passageway therethrough in communication with a gas source, and the key code ring mates with the key pattern so as to form a manifold in communication with the first gas passageway and the second gas passageway.

19. The container of claim 12 wherein the key code ring defines a notch adjacent to the aperture of the closure, and further wherein the key pattern defines a protrusion from the connector, the protrusion configured to mate with the notch.

20. The container of claim 12 wherein the connector has internal threads for engaging external threads of the closure for coupling.

21. The container of claim 12 wherein the key code ring has a configuration that represents a specific chemical.

22. The container of claim 12 wherein the key code ring has a bottom side, the bottom side having a groove therein circumscribing a central aperture of the key code ring and in communication with a passageway in the closure.

23. The container of claim 12 further comprising a dip tube coupled to the probe and extending to a bottom of the inner container.

24. The container of claim 12 wherein the connector consists of a top section and a bottom section rotatably coupled to each other such that they may rotate freely with respect to one another.

* * * * *